United States Patent
Schmeichel (10) Patent No.: US 11,780,434 B2
(45) Date of Patent: Oct. 10, 2023

(54) LANE CHANGE INTENTION ESTIMATION OF A VEHICLE

(71) Applicant: Ford Global Technologies, LLC, Dearborn, MI (US)

(72) Inventor: Carsten Schmeichel, Sankt Augustin/NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 777 days.

(21) Appl. No.: 16/862,634

(22) Filed: Apr. 30, 2020

(65) Prior Publication Data
US 2020/0346644 A1 Nov. 5, 2020

(30) Foreign Application Priority Data

Apr. 30, 2019 (DE) .......................... 102019206178.8

(51) Int. Cl.
*B60W 30/095* (2012.01)
*B60W 30/12* (2020.01)
(Continued)

(52) U.S. Cl.
CPC ......... *B60W 30/0956* (2013.01); *B60K 35/00* (2013.01); *B60W 30/12* (2013.01);
(Continued)

(58) Field of Classification Search
CPC .. B60W 30/0956; B60W 30/12; B60W 50/14; B60W 2554/803; B60W 2554/4045; B60W 2554/801; B60W 2050/146; B60W 2520/10; B60W 2520/14; B60W 2540/18; G06V 20/584; B60K 35/00
See application file for complete search history.

(56) References Cited

U.S. PATENT DOCUMENTS

| 9,159,023 | B2 | 10/2015 | Bone et al. |
| 9,625,910 | B2 | 4/2017 | Choi et al. |

(Continued)

FOREIGN PATENT DOCUMENTS

| DE | 102007029483 A1 | 1/2009 |
| DE | 102013219023 A1 | 3/2015 |

(Continued)

OTHER PUBLICATIONS

DE Examination Report dated Nov. 29, 2019 re DE Appl. No. 102019206178.8.

(Continued)

*Primary Examiner* — Michael D Lang
(74) *Attorney, Agent, or Firm* — Frank A. MacKenzie; Bejin Bieneman PLC (57) ABSTRACT

Estimating a lane change intention of a vehicle includes capturing a plurality of different lane change indicator signals, transforming the respective lane change indicator signals into respective associated individual probabilities of a lane change using respective assigned transformation functions, weighting these individual probabilities of a lane change, determining a weighted overall probability of a lane change as the average of the weighted individual probabilities of a lane change, and estimating the existence of a lane change intention depending on the overall probability of a lane change, and outputting an associated lane change estimation signal.

18 Claims, 9 Drawing Sheets

(51) Int. Cl.
  *B60W 50/14* (2020.01)
  *B60K 35/00* (2006.01)
  *G06V 20/58* (2022.01)

(52) U.S. Cl.
  CPC ........... *B60W 50/14* (2013.01); *G06V 20/584* (2022.01); *B60W 2050/146* (2013.01); *B60W 2520/10* (2013.01); *B60W 2520/14* (2013.01); *B60W 2540/18* (2013.01); *B60W 2554/4045* (2020.02); *B60W 2554/801* (2020.02); *B60W 2554/803* (2020.02)

(56) References Cited

U.S. PATENT DOCUMENTS

| | | |
|---|---|---|
| 2013/0085976 A1 | 4/2013 | Bone et al. |
| 2015/0355641 A1 | 12/2015 | Choi et al. |
| 2017/0174261 A1 | 6/2017 | Micks et al. |
| 2018/0281814 A1 | 10/2018 | Murray |

FOREIGN PATENT DOCUMENTS

| | | |
|---|---|---|
| DE | 102016106983 A1 | 10/2017 |
| WO | 2016071478 A1 | 5/2016 |

OTHER PUBLICATIONS

Bengtsson, "Detection and prediction of lane changes: A study to infer driver intent using support vector machine", Master of Science Thesis MMK 2012:08 MDA 429 KTH Industrial Engineering and Management Machine Design SE-100 44 Stockholm.

Ma et al., "DrivingSense: Dangerous Driving Behavior Identification Based on Smartphone Autocalibration", Hindawi Mobile Information Systems vol. 2017, Article ID 9075653, 15 pageshttps://doi.org/10.1155/2017/9075653.

LANE CHANGE INTENTION ESTIMATION OF A VEHICLE

CROSS-REFERENCE TO RELATED APPLICATION

This patent application claims priority to German Application No. DE102019206178.8 filed on Apr. 30, 2019, which is hereby incorporated by reference in its entirety.

BACKGROUND

In order for vehicle assistance systems to respond to driving situations by (only) warning the driver and/or by intervening themselves in vehicle control, for example to warn or assist the driver during an event which may lead to an accident, it may be necessary to interpret the behavior of the driver of the vehicle and assess his probable intention.

For this purpose, signals from sensors that observe the driver himself could be evaluated, for example.

Figure 1:
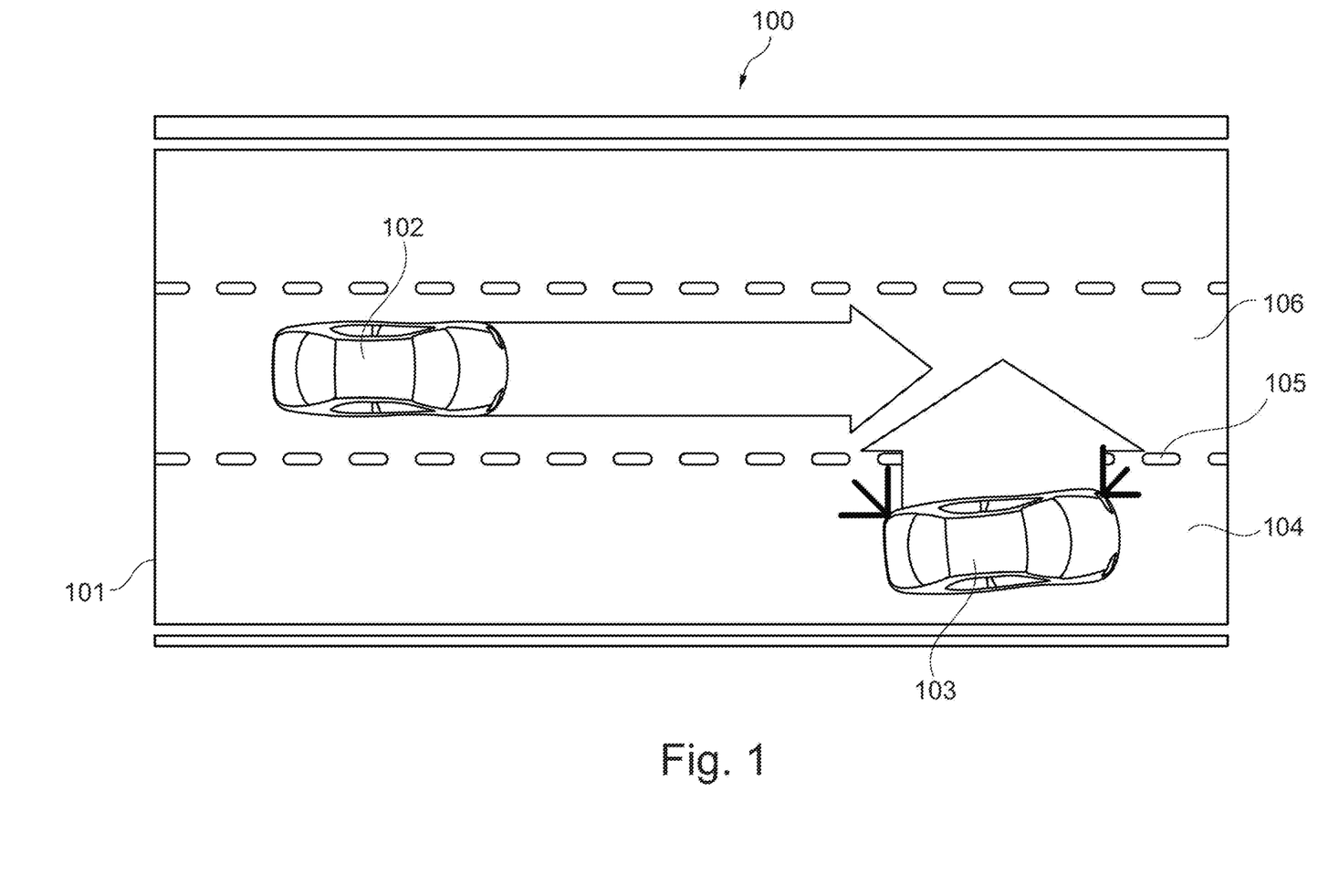
FIG. 1 shows a schematic representation of an example of a first lane change situation.

Lane-keeping assistance systems can warn the driver when his vehicle leaves the lane in which it is travelling and may provide lane-keeping assistance where the assistance system may actively intervene in the steering of the vehicle to assist the driver in keeping the vehicle in the lane. In particular, it may be provided to warn the driver or to influence the change of lane if the vehicle attempts to change lanes even though there is a risk of accident with another vehicle, for example if the other vehicle is in a blind spot for the driver of the vehicle with the lane-keeping assistance system or, as in the first lane change situation 100 shown in FIG. 1 by way of example, another vehicle 102 is approaching very quickly from behind the vehicle 103 with the lane-keeping assistance system, which is driving on a first lane 104 with at least a left lane marking 105 (in the direction of travel) on a multi-lane road 101, for example a road or highway, wherein the other vehicle 102 is on the adjacent lane 106 to which the vehicle 103 wants to change.

U.S. Pat. No. 9,159,023 B2 reveals a system for predicting a driver's intention to change lanes, which checks several motivational and retention criteria to determine whether the lane should be changed and reasons why the lane change should not take place. For this purpose, for example, the speeds, accelerations and distances of and from vehicles travelling ahead and on an adjacent lane as well as the vehicle's own velocity are recorded and evaluated, taking into account whether the lane change indicator, i.e. the flasher, is activated.

U.S. Pat. No. 9,625,910 B2 reveals a lane change device for autonomous vehicles, which performs, for example, a lane detection of the road being travelled on and a detection of road characteristics, determines the velocity driven, i.e. the longitudinal velocity at which the vehicle is moving along the lane, the steering angle, a yaw rate of the vehicle and a lateral velocity, i.e. a sideways velocity at which the vehicle is moving transversely to the lane, and a course angle, i.e. an angle of the movement of the vehicle relative to the course of the lane, and generates therefrom control information, which may be utilized for steering the vehicle during the lane change.

US 2017/0174261 A1 reveals a method for detecting the movements and flashing signal status of other vehicles to reduce the likelihood of an accident during a lane change maneuver.

In "Detection and prediction of lane-changes: A study to infer driver intent using support vector machine," Staffan Bengtsson, Master thesis, KTH Stockholm, 2012, describes how lane changes can be detected and predicted better based on a support vector machine approach.

In "DrivingSense: Dangerous Driving Behavior Identification Based on Smartphone Autocalibration," Chummei Ma et al., Hindawi Mobile Information Systems, Volume 2017, Article ID 9075653, describes how dangerous driving behavior can be detected using a smartphone, wherein it is taken into account whether the direction of travel is changing and whether the indicator is activated.

WO 2016071478 reveals a system for predicting a trajectory of a vehicle, where predictions are made based on the yaw rate, the velocity and the steering angle, and these are then combined.

DETAILED DESCRIPTION

Described herein is a method for estimating a lane change intention of a vehicle, i.e. the intention of the driver of a vehicle to change the lane on a road with lane markings, as can be detected from the behavior of the vehicle. Also described herein is a device set up for carrying out the method as well as a computer program product and a computer-readable storage medium with instructions for performing the method.

It is helpful to enable a quick and reliable estimation of the lane change intention of a vehicle, i.e. of the driver of the vehicle, but determined on the basis of the vehicle's condition signals.

The method and device described herein is based on the object to provide a possibility to carry out an estimation of the lane change intention of a vehicle driving on a road with lane markings using onboard sensors, which enables a fast response with simultaneously increased reliability of the estimate.

A method for estimating a lane change intention of a vehicle includes capturing a plurality of different lane change indicator signals and transforming the respective lane change indicator signals into respective associated individual probabilities of a lane change using respective assigned transformation functions. Then weighting of these individual probabilities of a lane change and determination of a weighted overall probability of a lane change as the average of the weighted individual probabilities of a lane change are carried out. Finally, an estimate of the existence of a lane change intention is made depending on the overall probability of a lane change and an associated lane change estimation signal is output.

Figure 2:
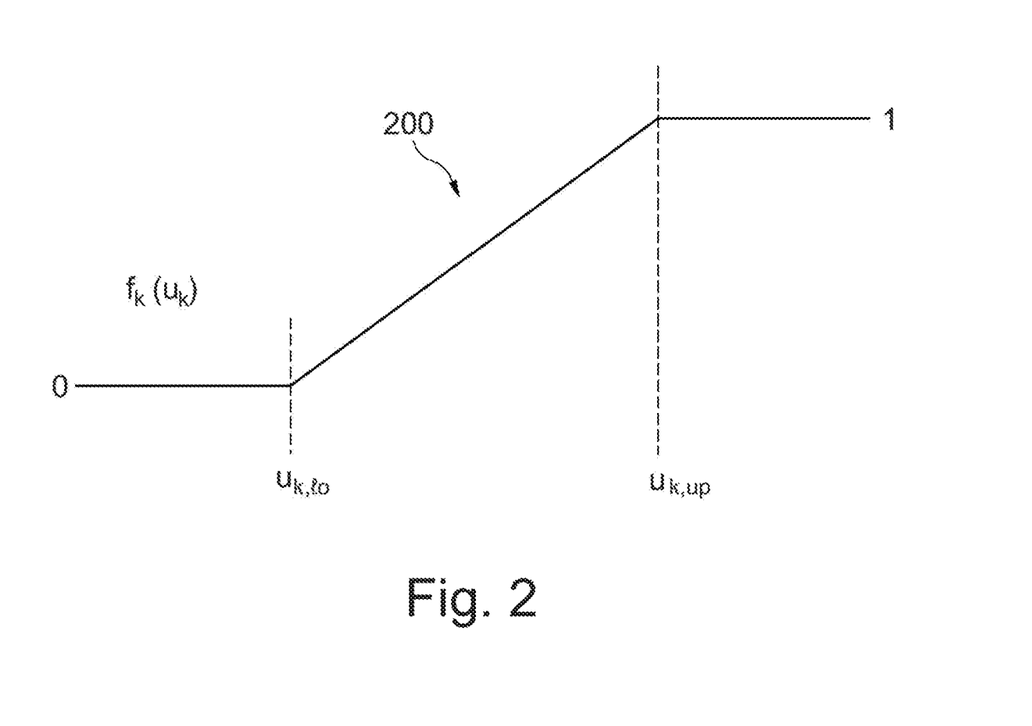
FIG. 2 shows a schematic representation of an example of a basic profile of a kth transformation function for transforming a lane change indicator signal into an associated individual probability of a lane change.

Lane change indicator signals are signals acquired by on-board sensors of the vehicle moving on a multi-lane road with lane markings and possibly performing a lane change, and a change to said signals allows a conclusion to be drawn regarding parameters of a lane change, for example a lateral distance from the left and/or right lane marking or a lateral velocity, but also by evaluating signals that can be acquired by an image sensor looking forward in the direction of travel, such as the current course angle, i.e. the angle of the vehicle's current direction of movement relative to the course of the lane marking detected by image analysis methods. Each of the lane change indicator signals is transformed into an associated individual probability of a lane change. That is, for each of the lane change indicator signals, a mapping of the signal values with a value range with an upper and lower limit is performed onto an associated probability signal with a value range of 0 to 1 or 0 percent to 100 percent using an assigned transformation function in each case. In one example, at least one of the transformation functions has a linearly increasing gradient between 0 and 1 (or 0 and 100 percent):

$$y_k = f_k(u_k) = \min\left(\max\left(\frac{u_k - u_{k,lo}}{u_{k,up} - u_{k,lo}}, 0\right), 1\right),$$

wherein the kth individual probability of a lane change $y_k$ results as a kth transformation function $f_k(u_k)$, with which the values of the kth lane change indicator signal $u_k$, whose value range extends from an associated lower limit value $u_{k,lo}$ to an associated upper limit value $u_{k,up}$ (with k=1, ..., n), are mapped onto the range 0 to 1, i.e. 0 percent to 100 percent. In FIG. 2 the corresponding basic profile 200 of a kth transformation function $f_k(u_k)$ for transforming a kth lane change indicator signal $u_k$ into an associated individual probability of a lane change $y_k$ is shown schematically by way of example. In an example, all n transformation functions have this basic profile, each with upper and lower limit values $u_{k,up}$ and $u_{k,lo}$ of the range of values of the respective lane change indicator signal $u_k$ associated with the respective lane change indicator signal $u_k$.

The weighting of the individual probabilities of a lane change $y_k$ with weighting factors wk before determining the weighted overall probability of a lane change $y_{mb}$ as an average of the weighted individual probabilities of a lane change can occur according to their significance. The average of the overall probability of a lane change $y_{mb}$ can be determined for n individual probabilities of a lane change, for example, as follows:

$$y_{mb} = \frac{w_1 y_1 + \cdots + w_n y_n}{w_1 + \cdots + w_n}.$$

For example, determining a mean overall probability of a lane change as a weighted average of the individual probabilities of a lane change has the advantage that a dependence on individual indicators is avoided, since otherwise the evaluation of individual signals can lead to incorrect detections more quickly, for example due to inaccurate noise-affected signals or misinterpretation of normal steering when following a winding lane. In addition, a dependence of the individual probability of a lane change on the longitudinal and/or lateral velocity of the vehicle can be easily taken into account by adjusting the limit values and, if necessary, the weightings, so that the reliability of the determined value for the individual probability of a lane change increases despite simple, fast predictability.

Estimating the existence of a lane change intention depending on the overall probability of a lane change and issuing an associated lane change estimation signal may consist of outputting the determined overall probability of a lane change, or a further simplification, such as a classification using one or more thresholds (for example "highly likely lane change", "probable lane change", "probably no lane change").

The described method can be realized, for example, by a control circuit connected to the vehicle sensors. Apart from capturing the plurality of different lane change indicator signals, it may also be entirely or partly a computer-implemented method.

In one example it is provided that the plurality of different lane change indicator signals includes at least one course angle signal, a lateral distance signal, and a lateral velocity signal. The course angle signal indicates an angle of movement of the vehicle relative to the course of the lane. It is determined, for example, by recording the course of the lane markings relative to the orientation of the vehicle in video images of a front camera sensor looking forward in the direction of travel. The lateral distance signal indicates the lateral distance of the vehicle from the left and/or right lane markings of the lane on which the vehicle is travelling. The lateral velocity signal indicates a sideways velocity of the vehicle at which the vehicle is moving across the lane towards or away from a left or right lane marking. The course angle signal, lateral distance signal and lateral velocity signal are clear indicators for a lane change.

In an example, the plurality of different lane change indicator signals also includes a steering angle signal and a yaw rate signal. The steering angle signal describes the variation of the steering angle, i.e. the angle by which the steering wheel of the vehicle is deflected from a resting position, such as the position for the straight-ahead travel of the vehicle, when the vehicle is being controlled by the driver. The yaw rate signal captures the yaw rate of the vehicle, i.e. the angular velocity of the vehicle's rotation around its own vertical axis, from the change of which the beginning of a lane change can in particular be deduced.

The above-mentioned lane change indicator signals $u_k$ show certain associated variations during a lane change. The time profiles 300 of the lane change indicator signals during a lane change (to an adjacent left lane) are shown by way of example in FIG. 3 against time tin each case, wherein the lane change indicator signal $u_1$ shows a typical profile of a steering angle signal 301 during a lane change, the lane change indicator signal $u_2$ shows a yaw rate signal 302, the lane change indicator signal $u_3$ shows a lateral velocity signal 303, the lane change indicator signal $u_4$ shows a course angle signal 304 and the lane change indicator signal $u^5$ shows a lateral distance signal with respect to a left lane marking 305 (solid line) or with respect to a right lane marking 306 (dotted line), for a lane change in each case. The steering angle signal 301 and the yaw rate signal 302 show an at least approximate sinusoidal variation during the lane change, while the lateral velocity signal 303 and the course angle signal 304 show an at least approximate semi-sinusoidal variation, wherein the lateral distance signal 305, 306 only increases until the respective left or right lane marking is reached. In order to quickly identify the intention to change lanes, in particular approximately the first third of the period of the lane change is important, i.e. the period before the center of the vehicle has crossed the road markings.

In an example, the method also includes compensating the steering angle signal and the yaw rate signal depending on the course of the road. This offers the advantage that the otherwise existing deviation from the previously described typical profile of the steering angle signal and the yaw rate signal have no or only a small influence on the associated individual probabilities of a lane change determined based on the steering angle signal and the yaw rate signal an improved accuracy.

In an example, the method also includes capturing a longitudinal velocity signal of the vehicle with a longitudinal velocity sensor device and adjusting at least one of the transformation functions associated with the steering angle signal, the yaw rate signal, or the course angle signal depending on the detected longitudinal velocity signal. For example, all three assigned transformation functions are adjusted depending on the longitudinal velocity signal. During the adjustment, the longitudinal velocity is used to adjust the respective lower limit value $u_{k,lo}$ and upper limit value $u_{k,up}$ of the steering angle signal, the yaw rate signal and/or the lateral velocity signal depending on the velocity, so that, for example, the signal of the respective associated individual probability of a lane change also has a sensitivity that depends on the longitudinal velocity at which the vehicle is moving.

In addition, it is provided that the determined overall probability of a lane change is increased depending on the situation detected by one or a combination of two or more lane change indicators, i.e. is weighted by a factor greater than or at least equal to 1. This has the advantage that in certain situations in which further lane change indicators indicate for or against the existence of a lane change intention, an assessment of the situation is made more quickly because the sensitivity of the method is increased.

In an example, the method includes detecting a state signal of a lane change display device of the vehicle as well as increasing the overall probability of a lane change depending on the state signal of the lane change display device. The lane change display device usually includes at least four turn indicator lights, wherein the driver can activate either the left or the right indicator lights to flash with an activation means to indicate to other road users that the vehicle will move in this direction. The increase may raise the sensitivity of the estimation of the lane change intention depending on the state of the lane change display device. The detection of a state signal of the lane change display device is used to improve the method without the method requiring detection of the state signal to function correctly.

In an example, the state signal of the lane change display device indicates an activation period and a side of the vehicle. The multiplication factor due to the lane change display device depends on its activation period, wherein, for example, a first period of a short activation duration, a second period of a normal activation duration, and a third period of a longer than normal activation duration are differentiated.

For example, it may be provided that in the first period of a short activation duration, for example the duration of tapping the activation means, i.e. usually the turn signal lever, the multiplication factor is increased for a short period of time, wherein the period lasts longer than the tapping duration, in order to take this signal into account even if the lane change is carried out shortly after tapping the turn signal lever and the lane change device is already deactivated again. For example, it may also be provided that in the second period with a normal activation duration the multiplication factor is applied continuously unchanged. For example, it may also be provided that during the third period of a longer than normal activation duration, during which it is assumed that the driver has forgotten to deactivate the vehicle change display device, the multiplication factor will be continuously reduced over a certain period of time until it has the value 1 again, i.e. no more multiplication occurs. In this way, for example, indicated lane changes are more likely to be considered as such.

In an example, the method also includes determining a sideways motion state of the vehicle, and the increase of the overall probability of a lane change is also carried out depending on the determined sideways motion state. The sideways motion state indicates whether the vehicle is moving sideways in the direction currently indicated by the lane change device. In order to determine whether a lane change is taking place, for example, the course angle signal and the lateral distance signal are evaluated by comparison with suitable threshold values. If the lane change device is then deactivated, even though the lane change has not yet been completed, it is planned to leave the multiplication factor unchanged until the lane change is completed.

Overall, using the state signal of the lane change indicator device to control a multiplication factor instead of viewing it as a separate lane change indicator signal offers the advantage of reducing the likelihood of incorrectly detecting a lane change, for example when the lane change display device is activated, i.e. the turn indicator is turned on without actually starting a lane change, for example to indicate to other road users that the there is a wish for a lane change and cooperative behavior is to be triggered, for example by actively freeing up space for the lane change, for example by braking or by other road users changing lanes.

In an example, the method also includes transforming the lateral distance signal into a distance-dependent multiplication factor and increasing the overall probability of a lane change depending on the distance-dependent multiplication factor. In particular, it is provided that the sensitivity of the lane change estimation is increased by increasing the distance-dependent multiplication factor when the vehicle comes close to the lane marking. The distance-dependent multiplication factor can be influenced by several parameters: on the one hand, by the actual lateral distance from the lane marking, wherein the distance-dependent multiplication factor is applied with a transformation function similar to the one shown in FIG. 2, for example, wherein it is provided to map the distance of the vehicle from the road marking onto a value range for the distance-dependent multiplication factor, which can have a lower limit value of 1 (no increase) and an upper limit value to be determined that is greater than 1. In an example, it is provided that the lower limit value is not fixed, but depends on the lateral clearance, i.e. on the remaining lateral space available in the lane, which can be determined by forming the difference of the lane width and the vehicle width. In yet another example, it is provided that the distance-dependent multiplication factor also depends directly on the lane width. Here, the lane width is first checked and the distance-dependent multiplication factor is set to a value greater than 1 only if a minimum width is exceeded. In this way, an increased sensitivity is avoided when the vehicle is moving through an area with unusually narrow lanes, especially when passing through construction sites.

In another example, it is also provided that increasing the overall probability of a lane change is carried out depending on the lateral velocity signal. This implies, for example, that in order to further improve stability in the event of miscalculations, it may be provided that the distance-dependent multiplication factor can only take a value greater than 1 if the vehicle is actually moving laterally towards a road marking. This is determined, for example, by evaluating the lateral velocity signal.

The multiplication factor for increasing the value of the overall probability of a lane change may depend on the activity of the turn indicator, i.e. the state of the lane change device, or depending on the distance from the lane marking. For example, the multiplication factor depends both on the state of the lane change device as well as on the distance of the vehicle from the road marking. This means that the sensitivity of the lane change estimation is then increased, in particular when the lane change indicator device, i.e. the turn indicator device, of the vehicle is activated while the vehicle is moving close to the lane marking.

In another example of the method, it is provided that the increase of the overall probability of a lane change is not carried out during a multiplication interruption period, which starts when a first half of the vehicle crosses a first lane boundary line. This interruption period can be triggered, for example, by a trigger signal of an interruption controller. It may be provided that the multiplication interruption period ends after a fixed period that was determined, for example, in tests or depends on the length of the vehicle and/or the velocity. It may also be provided that the period ends when one or more of the lane change indicator signals indicates that the lane change is complete, for example when the course angle signal indicates that the vehicle is driving straight ahead again. The multiplication interruption period prevents the generation of otherwise high, possibly increased, values for the overall probability of a lane change, which could otherwise cause unintended vehicle behavior when a lane change (from a first lane to an adjacent second lane) is almost complete, i.e. the vehicle is already in a phase in which it is aligned with the course of the second lane, while another vehicle is travelling in a third lane adjacent to the second lane.

In particular, it is provided that the multiplication interruption period is terminated if the vehicle falls below a minimum distance from a second lane boundary line. This means that the multiplication interruption period is terminated prematurely if the vehicle falls below the minimum distance from the marking of the next lane, i.e. enters a multiplication activation zone defined by the minimum distance. This may be the case if the vehicle is travelling on a road of at least three lanes. Then it may be that a double lane change is possibly to be carried out. The multiplication interruption period will terminate before the regular end of the multiplication interruption period to enable a double lane change to be detected. Warnings can also be generated at the end of each individual lane change, but a double lane change to the third lane is also detected before the end of the regular multiplication interruption period. The multiplication interruption period reduces the likelihood of erroneous lane change detections by preventing additional increases of the overall probability of a lane change. In the event of a double lane change, the multiplication activation period is terminated prematurely by the vehicle entering the multiplication activation zone, so that additional multiplication is again possible. For example, the multiplication activation zone is a relative portion of the clearance in the lane, wherein the clearance is defined by the difference in the width of the lane and the width of the vehicle. This makes it easy to automatically adapt to different lane widths. In this way, single lane changes can also be easily distinguished from double lane changes.

Figure 3:
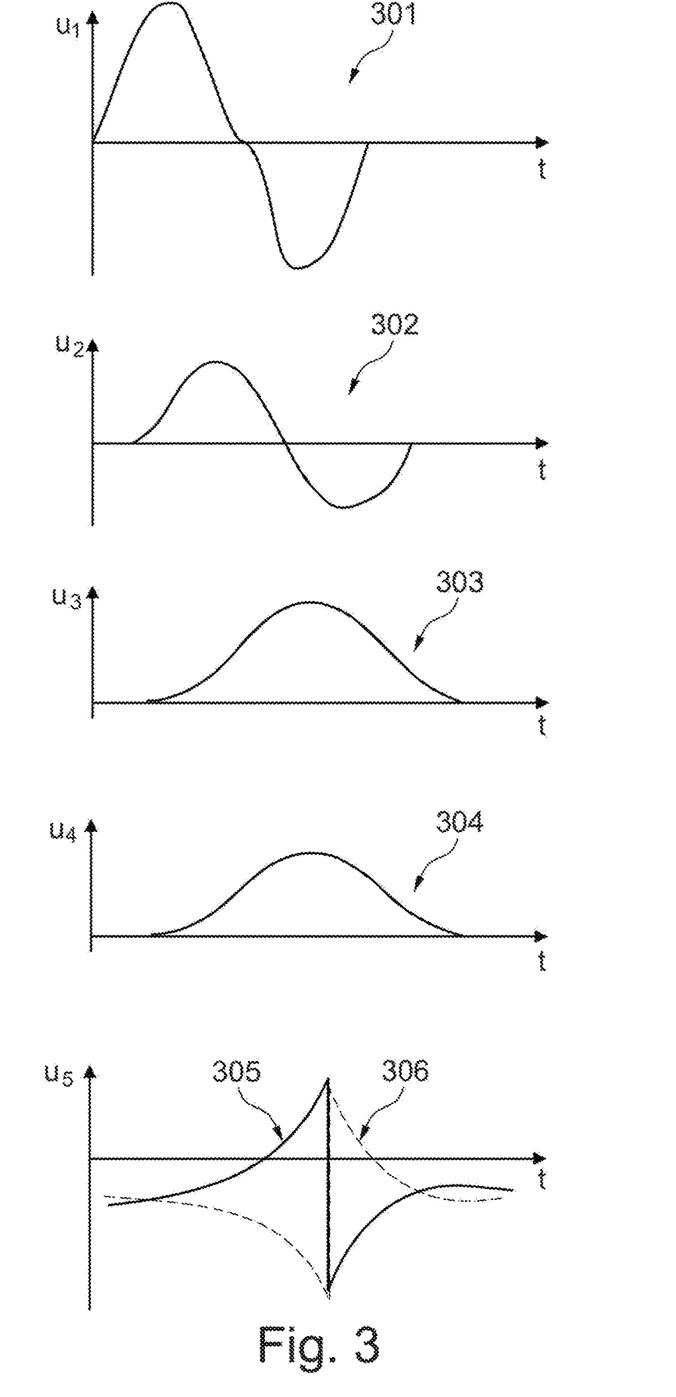
FIG. 3 shows a schematic representation of exemplary time profiles of lane change indicator signals during a lane change.

With the examples of the method described above, in particular fast lane changes can be detected particularly quickly, since the lane change indicator signals, in particular the steering angle signal, the yaw rate signal, the course angle signal and the lateral velocity signal, reach their upper limit values more quickly than with slow lane changes, see FIG. 3. If the estimation that a lane change is actually to be carried out is available faster, more time is available to generate an appropriate auxiliary torque when a higher torque is required to keep the vehicle in the lane.

In addition, in a further example it can also be provided to detect lane changes directly by evaluation of one or more lane change indicator signals and comparison with appropriately selected threshold values for the classification of a lane change. While the examples described above are particularly suitable for detecting rapid lane changes, even particularly slow lane changes can be detected in this way, wherein, for example, it may be provided to decide on the respective faster unambiguous assessment that there is a lane change.

A device for estimating a lane change intention of a vehicle includes a plurality of vehicle sensor devices for capturing a plurality of different lane change indicator signals and a signal analysis device designed to receive the detected plurality of different lane change indicator signals from the vehicle sensor devices and to output a lane change intention estimation signal, wherein the signal analysis device has a programmable device which is set up to perform steps of a method according to the method. Thus, the advantages and special features of the method for estimating a lane change intention of a vehicle are also carried over in the context of a suitable device for estimating a lane change intention of a vehicle.

The programmable device, which can be a computer, for example, implements units of the signal analysis device, possibly even the entire signal analysis device. If the entire signal analysis device is not implemented by the programmable device, the signal analysis device comprises one or more additional units with electrical circuits, logic circuits, or programmable logic modules with which steps of the method are implemented. The programmable device has at least one processor and one memory unit that stores portions of code that, when loaded and executed by the processor, cause the processor to perform the steps of the method. This can be all steps except capturing the lane change indicator signals with the on-board sensors.

A computer program product includes code portions for performing steps of a method according to the method when executed on a programmable device. A computer readable storage medium is also provided for storing instructions which, when executed by a computer or other programmable device, cause this computer or other programmable device to perform steps of a method according to the method. Thus, the advantages and special features of the method for estimating a lane change intention of a vehicle are also carried over in the context of a suitable computer program product and a suitable computer-readable storage medium.

In the figures, identical or similar elements are provided with identical reference characters, as far as this is appropriate.

It is understood that the characteristics of the various examples described above and described below may be combined, unless specifically stated otherwise. The description is therefore not to be construed in a restrictive sense.

Figure 4:
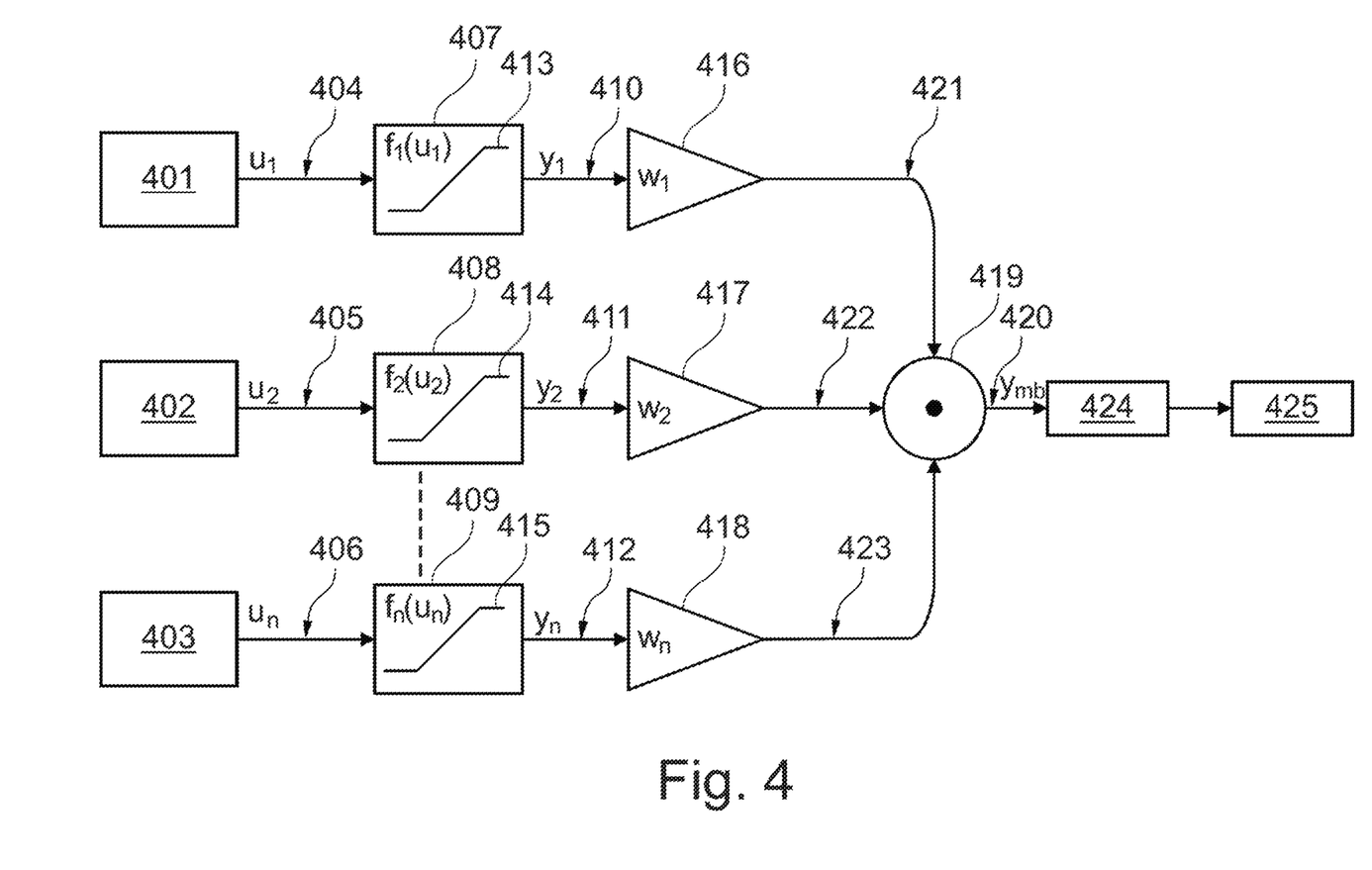
FIG. 4 shows a schematic representation of an example of a method for estimating a lane change intention of a vehicle according to a first example.

In FIG. 4 a schematic representation of an example of a method 400 for estimating a lane change intention of a vehicle is shown. The method 400 first provides the capture 401, 402, 403 of a plurality of different lane change indicator signals 404, 405, 406 ($u_1$, $u_2$, ..., $u_n$) and the transformations 407, 408, 409 of the respective lane change indicator signals 404, 405, 406 ($u_1$, $u_2$, ..., $u_n$) into respective associated individual probabilities of a lane change 410, 411, 412 ($y_1$, $y_2$, ..., $y_n$) using respective assigned transformation functions 413, 414, 415 ($f_1(u_1)$, $f_2(u_2)$, ..., $f_n(u_n)$). The transformation functions 413, 414, 415 ($f_1(u_1)$, $f_2(u_2)$, ..., $f_n(u_n)$) map the values of the lane change indicator signals 404, 405, 406 ($u_1$, $u_2$, ..., $u_n$) onto values in the range of 0 to 1, i.e., 0 percent to 100 percent. Then weighting 416, 417, 418 of these individual probabilities of a lane change 410, 411, 412 with respective associated weighting factors ($w_1$, $w_2$, ..., $w_n$) and determination 419 of a weighted overall probability of a lane change 420 ($y_m b$) as an average of the weighted individual probabilities of a lane change 421, 422, 423 ($w_1 y_1$, $w_2 y_2$, ..., $w_n y_n$) are carried out. Then an estimate 424 of the existence of a lane change intention is made depending on the overall probability of a lane change 420 ($y_{mb}$), and an associated lane change estimation signal is output 425.

Figure 5:
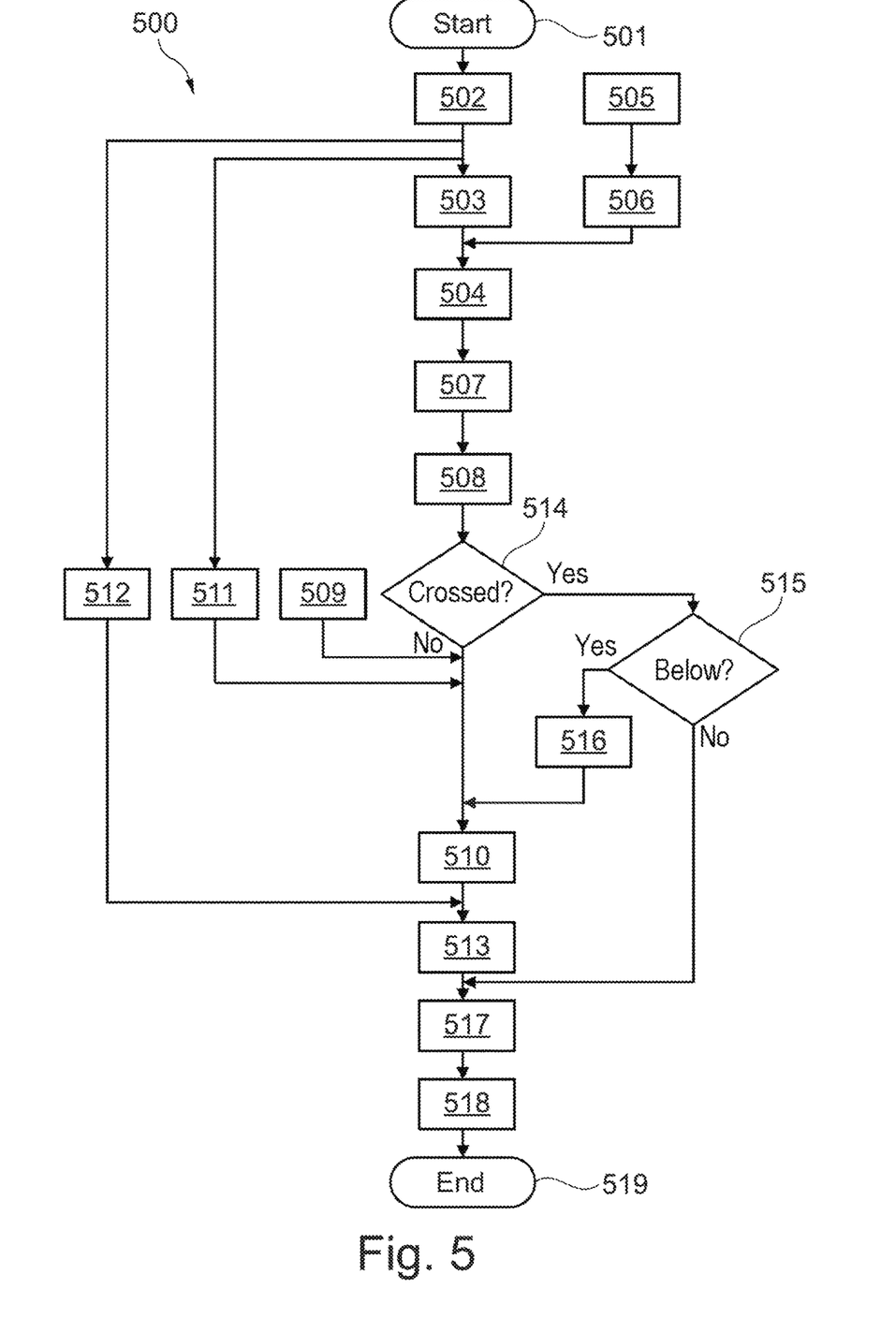
FIG. 5 shows a schematic representation of an example of a method for estimating a lane change intention of a vehicle according to a second example.

In FIG. 5 a schematic representation of an example of a method for estimating a lane change intention of a vehicle according to a second example is shown. The method 500 starts in a start state 501 and initially provides for the capture 502 of a plurality of different lane change indicator signals. The plurality of different lane change indicator signals includes a course angle signal, a lateral distance signal, a lateral velocity signal, a steering angle signal, and a yaw rate signal.

Then a compensation 503 of the steering angle signal and the yaw rate signal is carried out depending on the course of the road. In a next step, a transformation 504 of the respective lane change indicator signals into respective associated individual probabilities of a lane change using respective assigned transformation functions is carried out. In the example shown, moreover, capture 505 of a longitudinal velocity signal of the vehicle with a longitudinal velocity sensor device and adjustment 506 of at least one of the transformation functions associated with the steering angle signal, the yaw rate signal, or the course angle signal are provided depending on the detected longitudinal velocity signal.

In a next step, weighting 507 of these individual probabilities of a lane change with respective associated weighting factors is carried out and the determination 508 of a weighted overall probability of a lane change is carried out as an average of the weighted individual probabilities of a lane change. In addition, the detection 509 of a state signal of a lane change display device of the vehicle is carried out. In a next step, the overall probability of a lane change is then increased 510 depending on the state signal of the lane change display device, wherein the state signal of the lane change display device indicates an activation time and a side of the vehicle.

In the example shown, the determination 511 of a sideways motion state of the vehicle is also carried out based on at least one of the lane indicator signals, for example, the lateral velocity signal. The increase 510 of the overall probability of a lane change is then also carried out depending on the determined sideways motion state. In yet another step, the transformation 512 of the detected lateral distance signal into a distance-dependent multiplication factor is provided. Then increasing 513 the overall probability of a lane change is carried out depending on the distance-dependent multiplication factor, wherein in the example shown the increase 513 of the overall probability of a lane change is carried out depending on the lateral velocity signal.

In the example shown, it is provided that after determination 508 of the weighted overall probability of a lane change, a check 514 is first carried out as to whether a first half of the vehicle has crossed a first lane boundary line. If this is the case, increasing 510, 513 the overall probability of a lane change (i.e. the weighted overall probability of a lane change) is not necessary during a multiplication interruption period that begins when the first half of the vehicle crosses the first lane boundary line. If this is not the case, the increase 510, 513 is carried out. In addition, a check 515 is carried out to determine whether the vehicle is below a minimum distance from a second lane boundary line or whether a scheduled time has elapsed until the regular termination of the multiplication interruption period. If this is the case, the multiplication interruption period is terminated 516 and the method continues with increasing 510, 513 the overall probability of a lane change. If this is not the case, no further increase will be carried out. Finally, an estimation 517 of the existence of a lane change intention is carried out depending on the possibly increased, i.e. increased by a multiplication factor, overall probability of a lane change and an associated lane change estimation signal is output 518. Then the method transitions into an end state 519.

Figure 6:
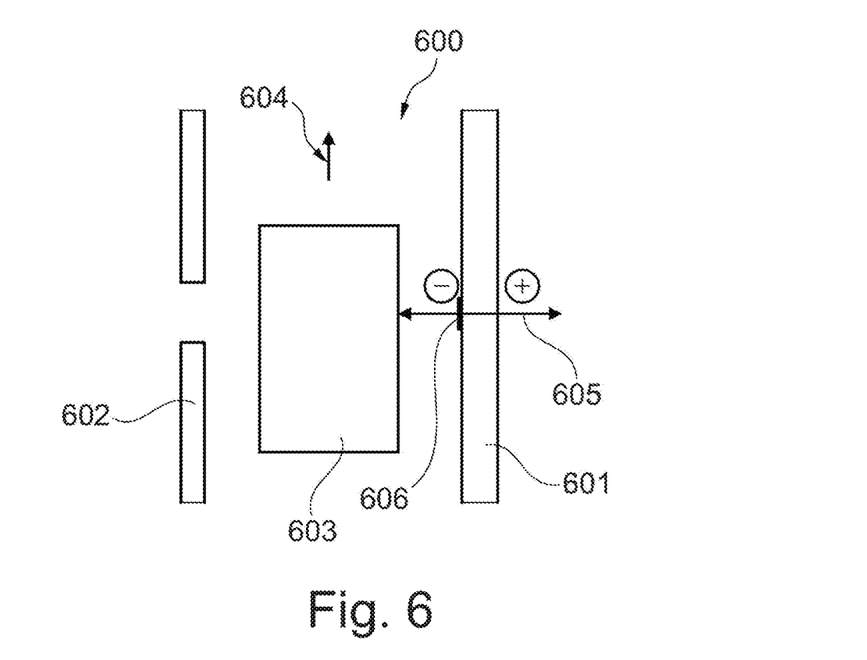
FIG. 6 shows a schematic representation of the lateral distance of a vehicle from the road marking.

In FIG. 6 a schematic representation of the lateral separation, i.e. the lateral distance or the sideways distance, of a vehicle from the road marking is shown. By way of example, a scenario is shown with a lane 600 with a right road marking 601 and a left road marking 602, on which there is a vehicle 603 with a direction of movement 604. As an example, the right lateral distance 605 is represented, wherein the zero point 606 of the right lateral distance is reached when the right side of the vehicle crosses the right road marking.

Figure 7:
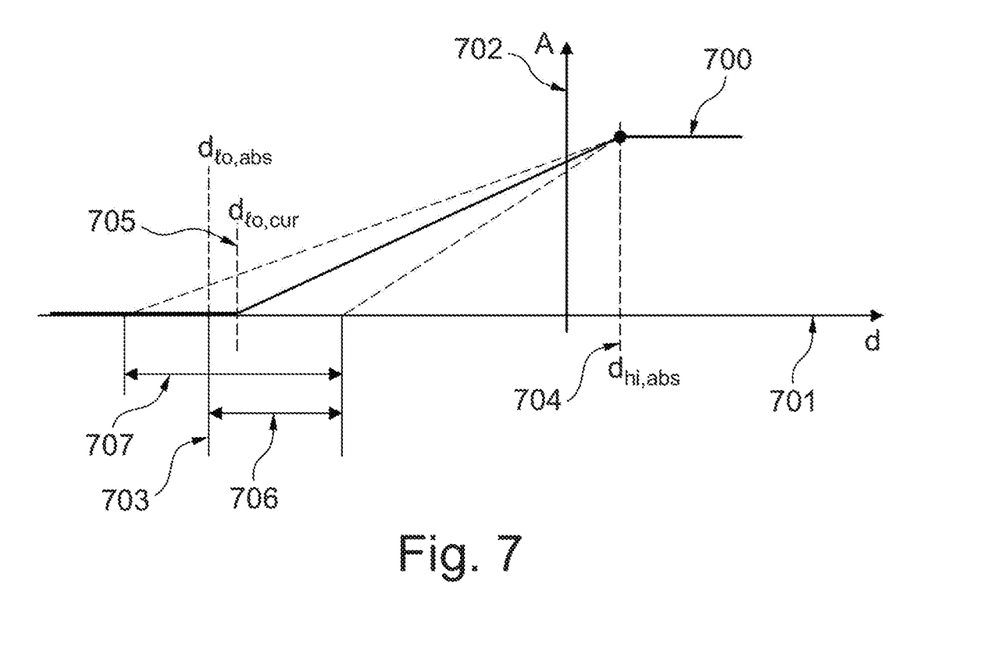
FIG. 7 shows a schematic representation of an example of a basic profile of a transformation function for transforming a lateral distance signal into an associated multiplication factor.

In FIG. 7 a schematic representation of an example of a basic profile of a transformation function for transforming a lateral distance signal into an associated multiplication factor is shown, with which the sensitivity of the lane change estimation can be raised, i.e. increased, depending on how close a vehicle approaches the lane marking and as a result a lane change intention appears particularly likely. The transformation function 700 describes the mapping of values of the captured lateral distance 701 ($d$) with an absolute lower distance limit value 703 ($d_{lo,abs}$) and an absolute upper distance limit value 704 ($d_{hi,abs}$) onto assigned values of the multiplication factor 702 ($A$) with a lower multiplication limit value 1 and an upper multiplication limit value. It should be borne in mind that the currently permissible lower distance limit value 705 ($d_{lo,cur}$) can only be within a currently permissible range 706 for the lower limit value, which in turn is only a partial range of the range 707 for the lower distance limit value that is dependent on the lateral clearance, wherein the lateral clearance is the distance remaining in the lane and is determined as the difference of the lane width and the vehicle width. In this case, the lane width should be greater than an appropriate limit value in order to avoid incorrectly large multiplication factors when the vehicle is driving through narrow sections of the road, for example when passing through construction sites.

Figure 8:
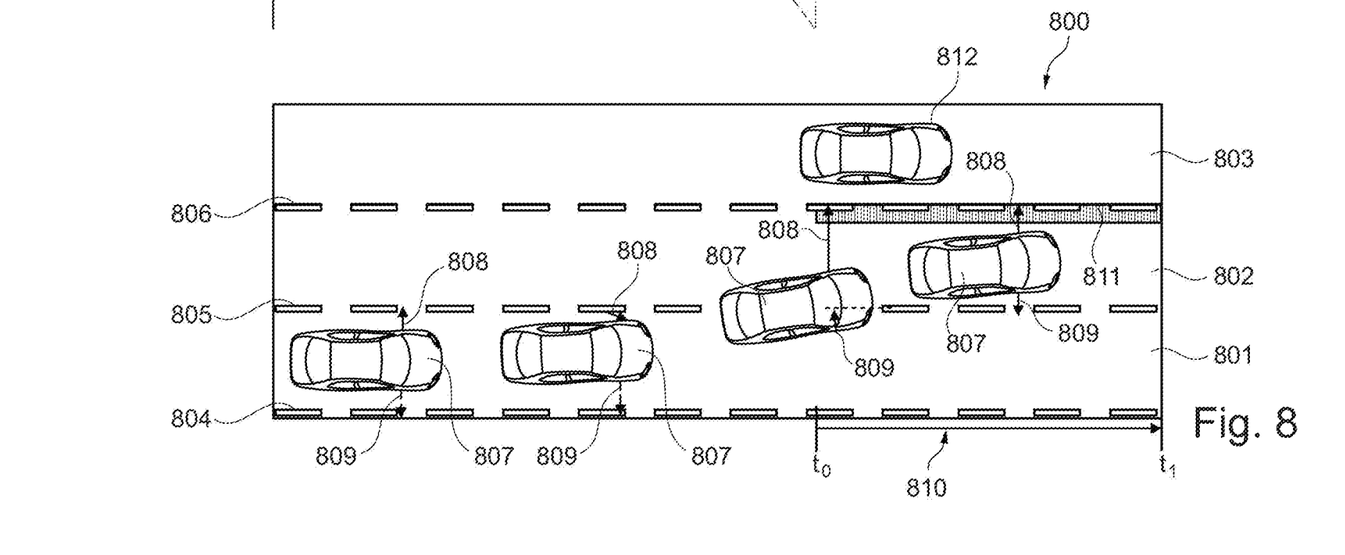
FIG. 8 shows a schematic representation of an example of a second lane change situation.
Figure 9:
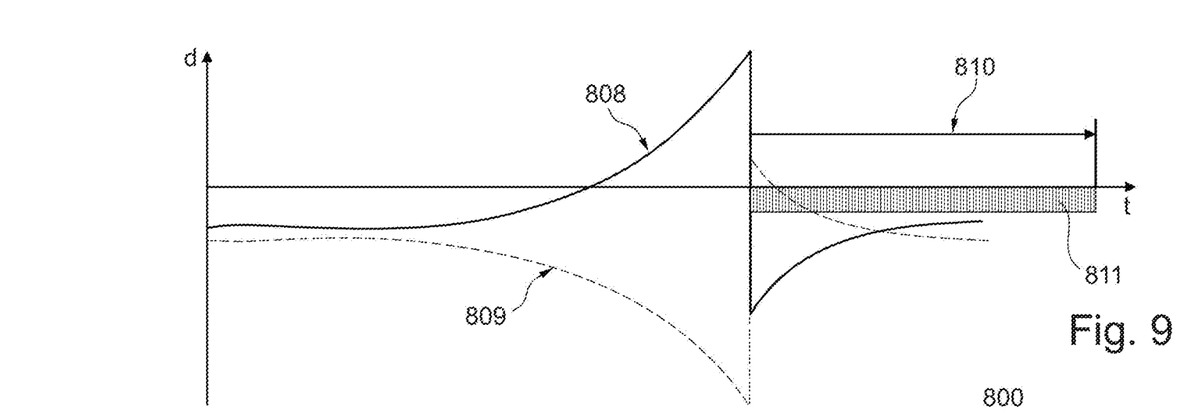
FIG. 9 shows a schematic representation of a profile of a lateral distance against time during a lane change.

FIG. 8 shows a schematic representation of an example of a second lane change situation. A road 800 has a first lane 801, a second lane 802, and a third lane 803, where a first road marking 804 bounds the first lane 801 to the right, a second road marking 805 separates the first lane 801 from the second lane 802 and a third road marking 806 separates the second lane 802 from the third lane 803. A vehicle 807 with a direction of movement shown from left to right in FIG. 8 is at a first lateral distance 808 from the respective left road marking and a second lateral distance 809 from the respective right road marking, which changes while the vehicle 807 performs a lane change to the second lane 802. FIG. 9 shows a profile of a lateral distance d against time t in the case of a lane change, more precisely the profile of the first lateral distance 808 (solid line) from the respective left road marking and the second lateral distance 809 (dashed line) from the respective right road marking against time t during the lane change related to the situation shown in FIG. 8. It is provided that an increase in the overall probability of a lane change during a multiplication interruption period 810 will be inhibited. This starts at a time to when a first half of the vehicle 807 crosses the second road marking 805. The multiplication interruption period ends at a time ti. In addition, a multiplication activation zone 811 is defined that is determined by a minimum distance from the third road marking 806 depending on the width of the lane and the vehicle width. If the lane change of vehicle 807 is not a simple change from the first lane 801 to the adjacent second lane 802, but a double lane change further to the third lane 803, the multiplication interruption period 810 would be terminated prematurely, so that the increase is reactivated and it can be quickly recognized that there is precisely the intention to carry out a lane change to the third lane 803, so that it is still possible to warn or intervene in good time, because there is another vehicle 812 on the third lane 803.

Figure 10:
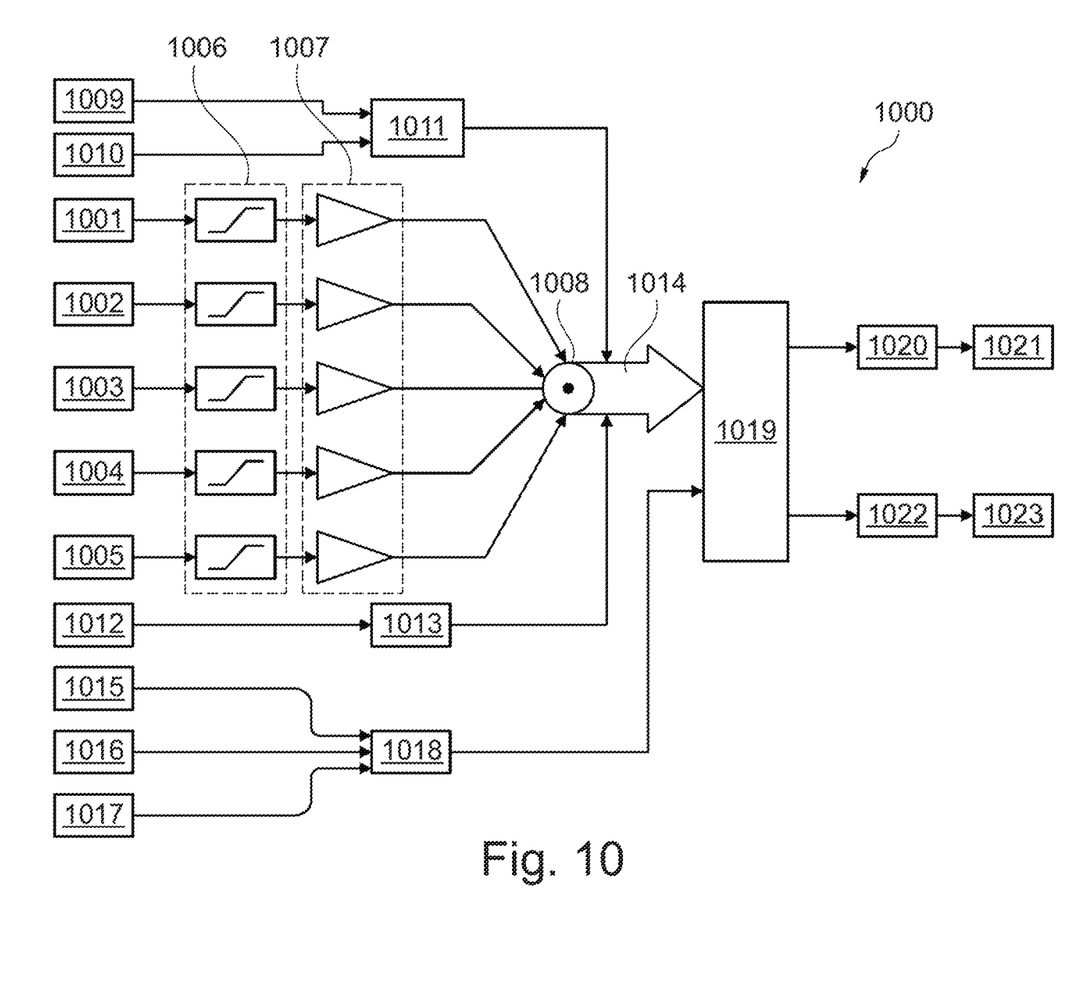
FIG. 10 shows a schematic representation of an example of a method for estimating a lane change intention of a vehicle.

A schematic representation of an example of a method for estimating a lane change intention of a vehicle according to a third example is shown in FIG. 10. The method 1000 initially provides for the capture of a lateral distance signal 1001, a yaw rate signal 1002, a steering angle signal 1003, a lateral velocity signal 1004, and a course angle signal 1005 as a plurality of different lane change indicator signals, as well as the transformation 1006 of the respective lane change indicator signals into respective associated individual probabilities of a lane change using respective assigned transformation functions. Then the weighting 1007 of these individual probabilities of a lane change with respective associated weighting factors and the determination 1008 of a weighted overall probability of a lane change as an average of the weighted individual probabilities of a lane change are carried out. In addition, an evaluation of the lateral distance signal 1009 and the lateral velocity signal 1010 is provided for determining 1011 a first multiplication factor for a situation-dependent increase of the determined overall probability of a lane change. In addition, an evaluation 1012 of a state signal of the lane change display device, i.e. the turn indicator device, of the vehicle is provided to determine 1013 a further multiplication factor, also for the situation-dependent multiplication of the determined overall probability of a lane change. The overall probability of a lane change, possibly increased by the multiplication factors, is adapted in a step for suppression and limitation 1014, wherein if there is a multiplication interruption period the increase is deactivated and it is reactivated if the vehicle enters a multiplication activation zone. In addition, it is provided to determine in parallel to the described steps a probability of a lane change also in a way suitable for slow lane changes. In this case, capture of the lateral velocity signal 1015 and the lateral distance signal 1016 as well as detection of the state signal of the lane change display device 1017 is carried out. In a further step, the probability of a lane change is then determined 1018 taking into account the lateral distance and the lateral velocity based on the current state of the lane change display device. In a further step, it is then provided to select 1019 either the possibly multiplied overall probability of a lane change or the probability of a lane change (for example by comparing the magnitudes of the values). Then an estimate 1020 is made of the existence of a lane change intention depending on the selected value and an associated lane change estimation signal for a left lane change is output 1021. Accordingly, an estimate 1022 may be made of the existence of a lane change intention depending on the selected value and an associated lane change estimation signal for a right lane change may be output 1023.

Figure 11:
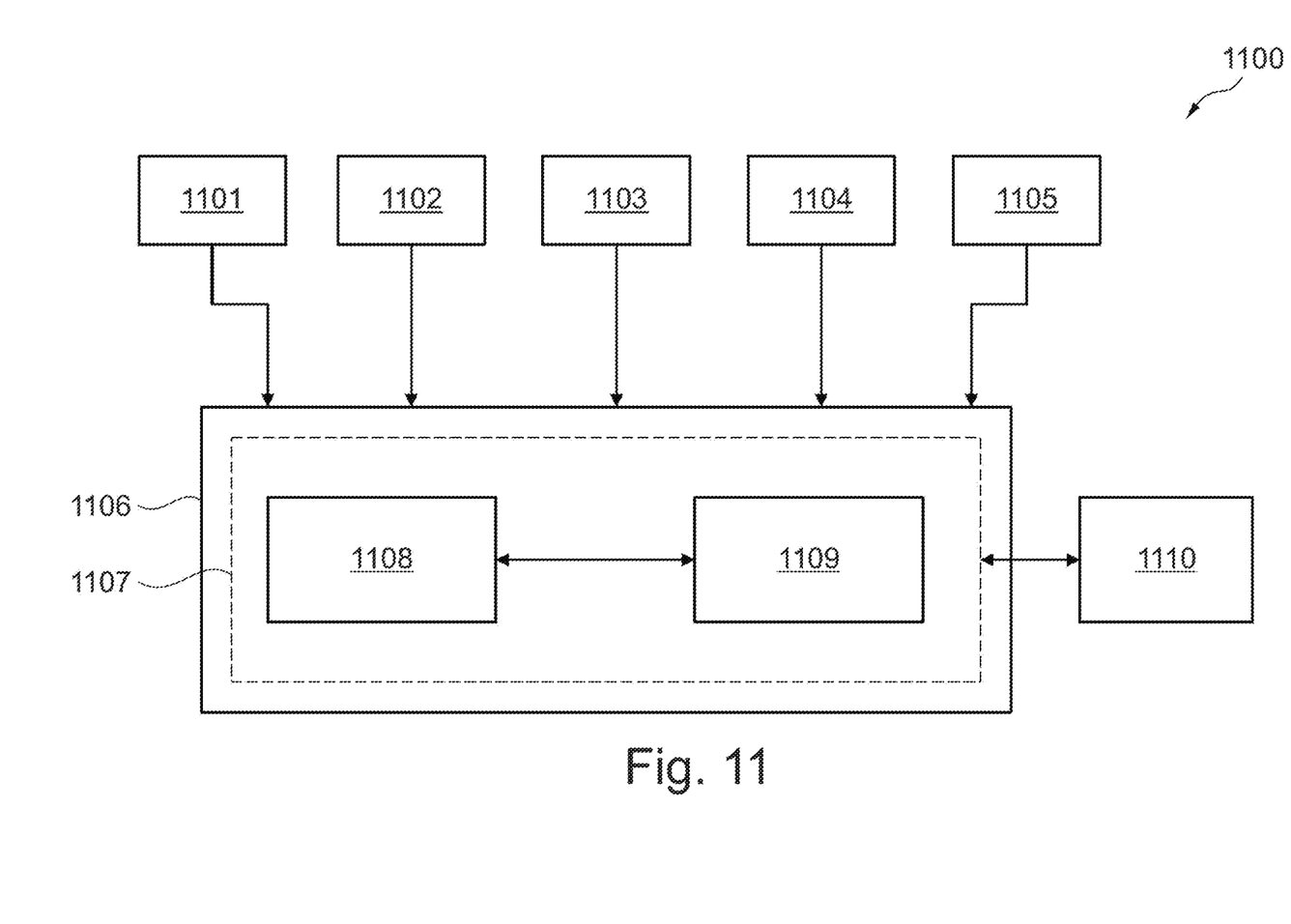
FIG. 11 shows a schematic representation of an example of a device for estimating a lane change intention of a vehicle.

In FIG. 11 a schematic representation of an example of a device for estimating a lane change intention of a vehicle according to a fourth example is shown. The device 1100 for estimating a lane change intention of a vehicle has a plurality of vehicle sensor devices 1101, 1102, 1103, 1104, 1105 for capturing a plurality of different lane change indicator signals. These are connected to a signal analysis device 1106, which is used to receive the detected plurality of different lane change indicator signals from the vehicle sensor devices 1101, 1102, 1103, 1104, 1105 and to output a lane change intention estimation signal. The signal analysis device 1106 shown comprises a programmable device 1107, which is set up to carry out steps of a method for estimating a lane change intention of a vehicle. In the example shown, the programmable device implements the entire signal analysis device 1106. If the entire signal analysis device is not implemented by the programmable device, the signal analysis device otherwise includes one or more additional units for implementing steps of the method. The programmable device includes at least one processor 1108 and one memory unit 1109. The latter stores code portions of a computer program product which, when loaded and run by the processor 1108 cause it to perform steps of the method. The code portions were provided for loading into the memory unit 1109 of the programmable device 1107, which can be a computer, from a computer-readable storage medium 1110, for example from a hard disk memory, a CD-ROM, or a DVD over a network from a connected data server, etc., where the code portions are stored.

It is understood that steps of the method, although described according to a certain order, could in part be performed in a different order from the order described herein. It is also understood that certain steps can be carried out simultaneously or sequentially, once or multiple times, that other steps could be added, or that certain steps described here could be omitted. In other words, the present descriptions are provided for the purpose of illustration and should not be construed as a restriction on the disclosed subject-matter.

The figures are not necessarily detailed and to scale and may be enlarged or reduced to provide a better overview. Therefore, the functional details disclosed here are not to be understood restrictively, but merely as a descriptive basis which provides guidance to the person skilled in this field of technology.

The term "and/or" used herein, when used in a series of two or more elements, means that each of the listed elements can be used alone, or any combination of two or more of the listed elements can be used. For example, if a composition is described as containing the components A, B, and/or C, the composition may include A alone; B alone; C alone; A and B in combination; A and C in combination; B and C in combination; or A, B, and C in combination. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

REFERENCE CHARACTER LIST 100 first lane change situation
101 multi-lane road
102 other vehicle
103 vehicle
104 first lane
105 left lane marking
106 adjacent lane
200 profile of a kth transformation function
300 time profiles 300 of lane change indicator signals during a lane change
301 profile of a steering angle signal
302 yaw rate signal
303 lateral velocity signal
304 course angle signal
305 lateral distance signal with respect to a left lane marking
306 lateral distance signal with respect to a right lane marking
400 method for estimating a vehicle's intention to change lanes
401 capturing a first lane change indicator signal
402 capturing a second lane change indicator signal
403 capturing an nth lane change indicator signal
404 first lane change indicator signal
405 second lane change indicator signal
406 nth lane change indicator signal
407 transforming the first lane change indicator signal
408 transforming the second lane change indicator signal
409 transforming the nth lane change indicator signal
410 first individual probability of a lane change
411 second individual probability of a lane change
412 nth individual probability of a lane change
413 first assigned transformation function
414 second assigned transformation function
415 nth assigned transformation function
416 weighting of the first individual probability of a lane change
417 weighting of the second individual probability of a lane change
418 weighting of the nth individual probability of a lane change
419 determining a weighted overall probability of a lane change
420 weighted overall probability of a lane change
421 first weighted individual probability of a lane change
422 second weighted individual probability of a lane change
423 nth weighted individual probability of a lane change
424 estimating the existence of a lane change intention
425 outputting an associated lane change estimation signal
500 method for estimating a vehicle's intention to change lanes
501 start state
502 capturing a plurality of lane change indicator signals
503 compensating the steering angle signal and the yaw rate signal
504 transforming the lane change indicator signals
505 capturing a longitudinal velocity signal
506 adjusting a transformation function
507 weighting individual probabilities of a lane change
508 determining an overall probability of a lane change
509 detecting a state signal
510 increasing the overall probability of a lane change
511 determining a sideways motion state
512 transforming the detected lateral distance signal
513 increasing the overall probability of a lane change
514 checking whether a first half of the vehicle has crossed a first lane boundary line
515 checking whether the vehicle is below a minimum distance from a second lane boundary line
516 terminating the multiplication interruption period
517 estimating the existence of a lane change intention
518 outputting an associated lane change estimation signal
519 end state
600 lane
601 right road markings
602 left road markings
603 vehicle
604 direction of movement
605 right lateral distance
606 zero point of the right lateral distance
700 transformation function
701 lateral distance
702 multiplication factor
703 absolute lower distance limit value
704 absolute upper distance limit value
705 currently permissible lower distance limit value
706 currently permissible range
707 range for the lower distance limit value dependent on the lateral clearance
800 road
801 first lane
802 second lane
803 third lane
804 first road marking
805 second road marking
806 third road marking
807 vehicle
808 first lateral distance from the respective left road marking
809 second lateral distance from the respective right road marking
810 multiplication interruption period
811 multiplication activation zone
812 other vehicle
1000 method for estimating a lane change intention
1001 capturing a lateral distance signal
1002 capturing a yaw rate signal
1003 capturing a steering angle signal 1004 capturing a lateral velocity signal
1005 capturing a course angle signal
1006 transforming the respective lane change indicator signals
1007 weighting these individual probabilities of a lane change
1008 determining an overall probability of a lane change
1009 evaluation of the lateral distance signal
1010 evaluation of the lateral velocity signal
1011 determining a first multiplication factor
1012 evaluating a state signal
1013 determining another multiplication factor
1014 suppressing and limiting
1015 capturing the lateral velocity signal
1016 capturing the lateral distance signal
1017 detecting the state signal of the lane change indicator
1018 determining the probability of a lane change
1019 selecting the total probability of a lane change or the probability of a lane change
1020 estimating the existence of a lane change intention to the left
1021 outputting an associated lane change estimation signal to the left
1022 estimating the existence of a lane change intention to the right
1023 outputting an associated lane change estimation signal to the right
1100 device for estimating a lane change intention
1101 vehicle sensor device
1102 vehicle sensor device
1103 vehicle sensor device
1104 vehicle sensor device
1105 vehicle sensor device
1106 signal analysis device
1107 programmable device
1108 processor
1109 memory unit
1110 computer-readable memory medium

The invention claimed is:

1. A device comprising:
a plurality of vehicle sensor devices for capturing a plurality of different lane change indicator signals; and
a signal analysis device designed to receive the detected plurality of different lane change indicator signals from the vehicle sensor devices and to output a lane change intention estimation signal, wherein the signal analysis device has a programmable device which is set up to:
capture a plurality of different lane change indicator signals, the lane change indicator signals including at least a lateral distance signal;
transform the respective lane change indicator signals into respective associated individual probabilities of a lane change using respective assigned transformation functions;
weight the respective individual probabilities of the lane change;
determine a weighted overall probability of the lane change as the average of the weighted individual probabilities of the lane change;
estimate the existence of a lane change intention depending on the overall probability of the lane change; and
output a lane change estimation signal associated with the lane change intention.

2. The device of claim 1, wherein the plurality of different lane change indicator signals includes at least one course angle signal and a lateral velocity signal.

3. The device of claim 2, wherein the plurality of different lane change indicator signals also includes a steering angle signal and a yaw rate signal.

4. The device of claim 3, wherein the programmable device is further set up to compensate the steering angle signal and the yaw rate signal depending on a course of the road.

5. The device of claim 3, wherein the programmable device is further set up to:
capture a longitudinal velocity signal of the vehicle with a longitudinal velocity sensor device; and
adjust at least one of the transformation functions associated with the steering angle signal, the yaw rate signal, or the course angle signal depending on the detected longitudinal velocity signal.

6. The device of claims 2, wherein the programmable device is further set up to:
detect a state signal of a lane change display device of the vehicle; and
increase the overall probability of a lane change depending on the state signal of the lane change display device.

7. The device of claim 6, wherein the state signal of the lane change display device indicates an activation period and a side of the vehicle.

8. The device of claim 6, wherein the programmable device is further set up to determine a sideways motion state of the vehicle, and the increase of the overall probability of the lane change is also carried out depending on the determined sideways motion state.

9. The device of claim 2, wherein the programmable device is further set up to
transform the lateral distance signal into a distance-dependent multiplication factor; and
increase the overall probability of a lane change depending on the distance-dependent multiplication factor.

10. The device of claim 9, wherein increasing the overall probability of the lane change is carried out depending on the lateral velocity signal.

11. The device of claim 9, wherein the increase of the overall probability of a lane change is not carried out during a multiplication interruption period, which starts when a first half of the vehicle crosses a first lane boundary line.

12. The device of claim 11, wherein the multiplication interruption period is terminated if the vehicle falls below a minimum distance from a second lane boundary line.

13. The device of claim 1, wherein the plurality of different lane change indicator signals also includes a steering angle signal and a yaw rate signal, and the programmable device is further set up to compensate the steering angle signal and the yaw rate signal depending on a course of the road.

14. The device of claim 1, wherein the plurality of different lane change indicator signals also includes at least one of a course angle signal, a steering angle signal, and a yaw rate signal; and
the programmable device is further set up to:
capture a longitudinal velocity signal of the vehicle with a longitudinal velocity sensor device; and
adjust at least one of the transformation functions associated with the steering angle signal, the yaw rate signal, or the course angle signal depending on the detected longitudinal velocity signal.

15. The device of claim 1, wherein the programmable device is further set up to determine a sideways motion state of the vehicle, and increase the overall probability of a lane change depending on the determined sideways motion state.

16. The device of claim 1, wherein the programmable device is further set up to
- transform the lateral distance signal into a distance-dependent multiplication factor; and
- increase the overall probability of a lane change depending on the distance-dependent multiplication factor.

17. A method comprising:
- capturing a plurality of different lane change indicator signals, the lane change indicator signals including at least a lateral distance signal;
- transforming the respective lane change indicator signals into respective associated individual probabilities of a lane change using respective assigned transformation functions;
- weighting the respective individual probabilities of the lane change;
- determining a weighted overall probability of the lane change as the average of the weighted individual probabilities of the lane change;
- estimating the existence of a lane change intention depending on the overall probability of the lane change; and
- outputting a lane change estimation signal associated with the lane change intention.

18. A computer comprising a processor and a memory storing instructions executable by the processor to:
- capture a plurality of different lane change indicator signals, the lane change indicator signals including at least a lateral distance signal;
- transform the respective lane change indicator signals into respective associated individual probabilities of a lane change using respective assigned transformation functions;
- weight the respective individual probabilities of the lane change;
- determine a weighted overall probability of the lane change as the average of the weighted individual probabilities of the lane change;
- estimate the existence of a lane change intention depending on the overall probability of the lane change; and
- output a lane change estimation signal associated with the lane change intention.

* * * * *